May 3, 1960 R. KELLER 2,934,887
DRIVING DEVICE FOR CLOCKWORK
Filed March 1, 1955 2 Sheets-Sheet 1
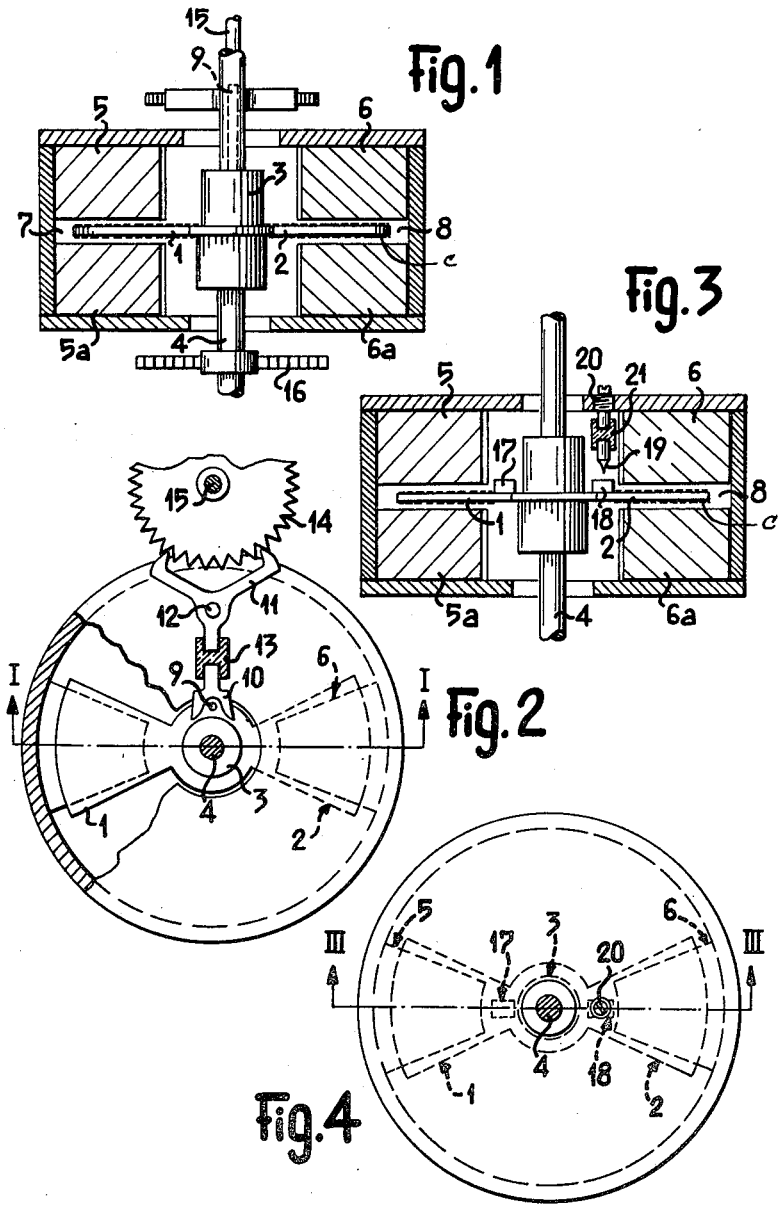
INVENTOR
ROBERT KELLER
By Young, Emery + Thompson
ATTYS.

May 3, 1960

R. KELLER 2,934,887

DRIVING DEVICE FOR CLOCKWORK

Filed March 1, 1955

INVENTOR
ROBERT KELLER
BY Irwin S. Thompson
ATTY.

United States Patent Office 2,934,887
Patented May 3, 1960

2,934,887
DRIVING DEVICE FOR CLOCKWORK

Robert Keller, Geneva, Switzerland, assignor to Ancienne Manufacture d'Horlogerie, Patek, Phillippe & Co. S.A., Geneva, Switzerland, a corporation of Switzerland Application March 1, 1955, Serial No. 491,437

Claims priority, application Switzerland March 2, 1954

5 Claims. (Cl. 58—28)

One known means for charging an electrode, insulated by vacuum or an insulated body, is to subject the electrode to $\alpha$ or $\beta$ radiations emitted by a layer of a radioactive element. See, for instance, "Nucleonics", December 1953, "Radio Isotopic High Potential Low Current Sources", by John H. Coleman. The electrons of the $\beta$ rays, for example, leave said electrode, penetrate a stator surrounding said electrode, and charge the stator negatively; consequently the electrode is positively charged.

The object of the invention is a driving device for a clockwork for instance, which is characterized by the fact that it comprises a variable condenser, the rotor or armature of which is angularly displaceable by electrostatic action, wherein one of the members, or plates, of the condenser includes a radioactive part by means of which the opposing members, or plates, receive opposite electrical charges with respect to each other which charging action causes an electrostatic action and a displacement of said armature. Means are provided to automatically discharge said condenser as the armature reaches a given position, after which discharge, a new cycle of loading and discharging operations begins again, and so on periodically.

The attached drawing illustrates by way of example three embodiments of the driving device according to the invention.

Fig. 1 is a schematical view of the first embodiment in axial cross section along line I—I of Fig. 2.

Fig. 2 is a plan view with parts taken away corresponding to Fig. 1.

Fig. 3 is a cross section view along line III—III of Fig. 4 of a second embodiment.

Fig. 4 is a plan view corresponding to Fig. 3.

Figure 5:
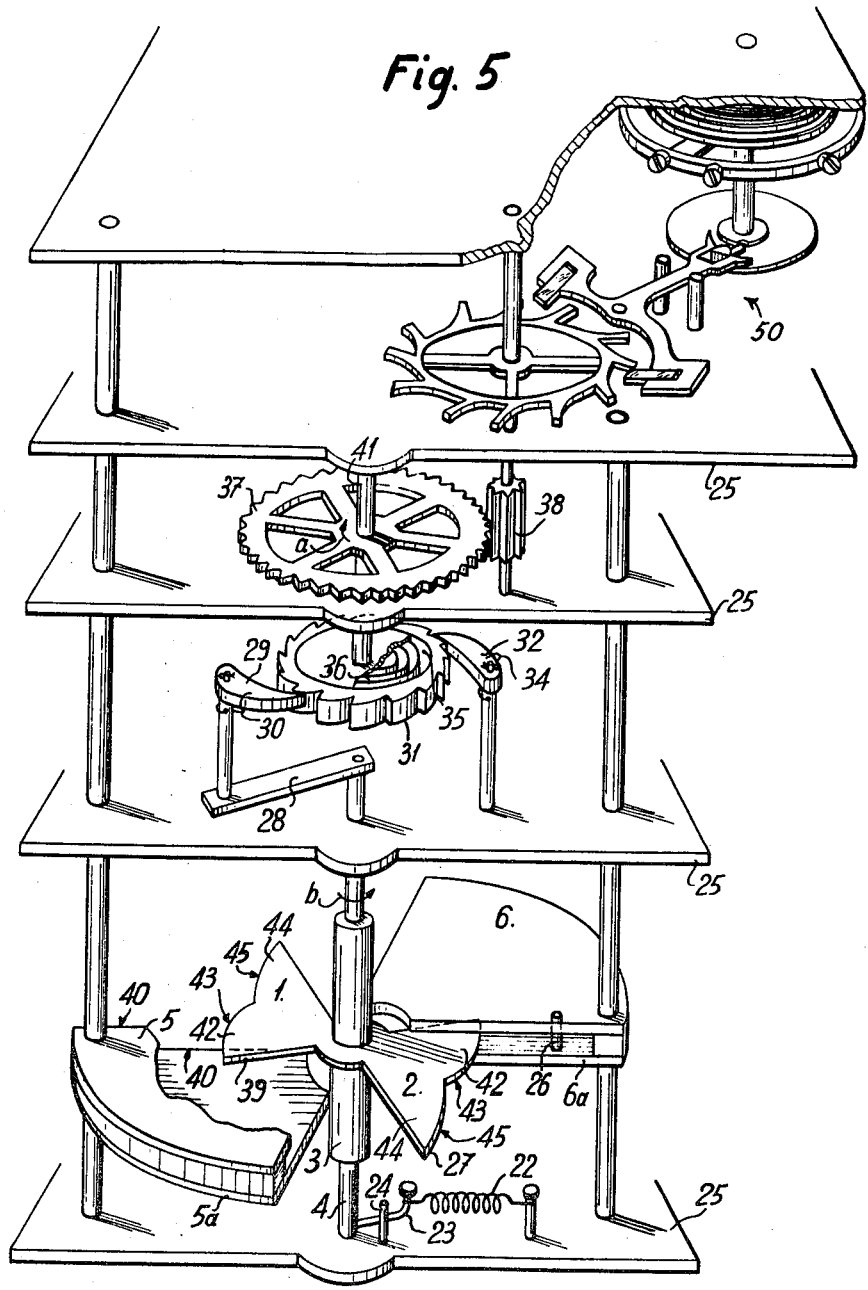
Fig. 5 is perspective view of a third embodiment.

The driving device illustrated in Fig. 1 and 2 comprises a variable condenser, the armature of which is rotatable and constituted by two electrodes 1 and 2 having the shape of sectors of a circle, rigidly fastened to an insulated sleeve 3 fastened to a swinging shaft 4. The stator of said condenser is fixed and comprises two groups of electrodes 5, 5a and 6, 6a. The electrodes of each of said groups are facing one another and said two groups of electrodes are arranged around said shaft 4 symmetrically with respect to said shaft. The electrodes 1 and 2 may thus revolve and penetrate between the fixed electrodes 5, 5a and 6, 6a owing to the spacing 7, 8 provided between said fixed electrodes of a same group.

In the position illustrated on the drawing, the electrode 5 is located above the electrode 5a and the movable electrode 1 may penetrate between them, whilst the electrode 6 is located above the electrode 6a and the movable electrode 2 may penetrate between them. The electrodes 5, 5a and 6, 6a present the shape of co-axial crown sectors spaced angularly.

The electrodes 1 and 2 are coated by a thin layer $c$ of a radioactive isotope such as for instance Co 60, C 14, Sr 90, Pu 238, etc.

A pin 9 rigidly fastened to said armature extends parallel to the shaft 4. Said pin is intended to cooperate with a fork 10 mechanically connected to a swinging lever 11 pivoted at 12, but electrically insulated from said swinging lever by means of a piece 13 constituted by a semiconductor having a high electric resistivity. Said swinging lever 11 cooperates with ratchet wheel 14 fastened to a shaft 15 driving the wheels or runners (not shown) of the clockwork.

A spiral spring 16 cooperates with the shaft 4 in the same manner as springs normally coact with the shaft of a balance wheel of a clockwork.

The operation of the driving device described above is as follows:

Assuming that the armature is entirely disengaged from the stator, the electrodes 1 and 2 will be progressively loaded as a result of the emission of loaded radioactive particles. As a result of the electrostatic action, the stator attracts the electrodes of said armature which penetrate into the spaces 7, 8 between said fixed electrodes. Thereby the capacity between said armature or movable electrodes and said fixed electrodes increases so that the electric energy is transformed into mechanical energy. When the armature is partially engaged in said stator, the fork 10 abuts against the pin 9, which causes the partial discharge of the movable electrodes through the resistance 13. The movable equipment follows its run and the movable electrodes move out the spaces 7, 8 and away from the stator because said stator attracts said movable electrodes with a weaker force than when they were approaching said stator. Thus there is a gain of mechanical energy. The spiral spring 16, which during said run has been wound, causes at a given moment the stopping of the rotatable parts, and then their return. Then begins a new half period of the oscillation during which the movable electrodes are again charged through the emission of radioactive particles and then the same process will begin again at each half oscillation. The movement of the fork 10 causes the movement of the swinging lever 11 and the step by step displacement of the ratchet wheel 14, as it is well known. Thus the armature oscillates periodically owing to its periodic charging and discharging and said armature works as a clockwork balance wheel with, however, the difference that there is no driving spring nor external source of electricity owing to the fact that the energy is fed to said balance wheel through the radioactive emission of the material $c$ deposited on the electrodes 1 and 2.

The power developed by a driving device such as described is about equal to $P = J\ U_{eff}$ where $J$ is the current of the emitted electrons from the movable electrodes and $U_{eff}$ the middle voltage to which said movable electrodes charge themselves. The middle voltage is given by the following approximative formula:

$$U_{eff} = \frac{JRC_t}{kC}$$

where R is the resistance 13, C and $C_t$ respectively the capacity of the electrodes when said electrodes are out of engagement with the stator and entirely engaged into said stator, and $k$ is a part of period during which the pin 9 makes contact with said swinging lever 11.

Advantage may be obtained by making R as great as possible, however, not so great that the voltage will overcome the value allowed by the insulation.

A numerical example is as follows:
With a radiation $\beta$ of 20 millicuries and $U_{eff} = 2000$ volts, $P = 0.24$ microwatt and with $$\frac{C_t}{C} = 10 \text{ and } k = \frac{1}{20}$$

$R = 8 \times 10^{10}$ ohm.

In the described example the armature performs an angularly oscillating movement.

In the second embodiment, the armature has a revolving movement, always in the same direction. The spiral spring 16 is omitted and the parts which are the same as those described with reference to the first embodiment bear the same reference numerals.

In said second embodiment a point effect causes the electric discharge of the movable electrodes 1 and 2 at the time where they pass over the position represented on the drawing. There are two plugs 17, 18 fastened to the base of each of the sectors 1, 2 and located in the common plan of symmetry of these sectors. These plugs are seen to pass at a little distance opposite a point 19 carried by an adjustable screw 20, and by the intermediary of a piece 21 of a semi-conductive material having a high electric resistivity. Each of the plugs 17, 18 are located opposite the point 19 at the moment where the corresponding sector 1 or 2 occupies the position in which the electrode 2 is illustrated in Fig. 4, that is to say at the moment where said sector is entirely within the space 8.

The operation of said second embodiment is as follows:

Starting from a position for which the electrodes are located out of registry with the stator, these electrodes being electrically charged consecutively by the radioactive emission of the material disposed on said electrodes, the movable parts revolve and said electrodes approach the stator. At the moment where one of the plugs 17, 18 passes in front of the point 19, said point discharges electrons by means of the well known phenomenon of the cold emission and discharges partially said electrodes. By means of its inertia said movable part continues to rotate, the electrodes leave the stator and begin to charge themselves consecutively by the radioactive emission. At the moment where the electrodes pass beyond an angular position perpendicular to that represented on the drawing (Fig. 4), said electrodes are sufficiently charged to be attracted by the stator and a new cycle of operations as described begins. The operation is thus just the same as the operation described with reference to the first embodiment and the mathematic formulas are the same.

It is advantageous to place the described driving device under vacuum. In the case where said device is set in a gas which is less advantageous than a vacuum, it is of advantage to coat the electrodes with an insulating layer, for instance with a very thin varnish, which allows the radiations to pass through. A part of the stator, as small as possible, will be left uncoated to allow the discharge.

In the embodiment represented in Fig. 5, the members and elements above described with reference to Figs. 1 to 4 bear the same reference numerals. The two electrodes 1 and 2 of the armature are rigidly fastened on the swinging shaft 4 by the intermediary of the insulating sleeve 3, symmetrically with respect to said shaft. The two groups of fixed electrodes 5, 5a and 6, 6a of the condenser are arranged around said shaft 4 and symmetrically with respect to said shaft. The armature is subjected to the action of a return spring 22 tending to maintain said armature in the position illustrated on the drawing and limited by means of an arm 23 fastened to the shaft 4 and abutting on a stop member 24 rigidly fastened to one of the mounting plates 25 of the clockwork.

As in the embodiments described above, the electrodes 1 and 2 may penetrate between the electrodes 5, 5a and 6, 6a of the stator. Additionally, the electrodes 1 and 2 are at least partially coated with a layer of a radioactive isotope such as Sr 90, for instance.

The angular displacement of the shaft 4 is limited by a pin 26 rigidly fastened to the fixed electrodes 6, 6a and on which the extremity 27 of the electrode 2 abuts.

An arm 28 rigidly fastened to the shaft 4, carries a driving pawl 29 subjected to the action of a spring 30 tending to maintain said pawl in mesh with the teeth of a ratchet wheel 31 revolving freely on a shaft 41. A retaining pawl 32 carried by a post rigidly fastened to one of the mounting plates 25 is maintained in mesh with said ratchet wheel 31 by means of a spring 34.

The ratchet wheel 31 comprises a recess 35 in which is housed a driving spring 36, one end of which is fastened to said ratchet wheel while its other end is fastened to the shaft 41. Said driving spring tends to drive said shaft 41 in a revolving movement in the direction of the arrow $a$.

The shaft 41 carries also a toothed wheel 37 meshing with a pinion 38 which constitutes the first member of the clockwork 50.

The operation of the electrostatic driving device described is as follows:

When the arm 23 abuts against the stop member 24, the edges 39 of the electrodes 1 and 2 are approximately located in the plane passing through the edges 40 of the electrodes 5, 5a and 6, 6a.

The radioactive substance carried by said electrodes 1 and 2 emits in a permanent manner radiations $\alpha$ or $\beta$. Consequently the condenser charges itself and the voltage between said electrodes 1, 2 and 5, 5a, 6, 6a increases progressively with time. Consequently the electrostatic force acting on the electrodes 1 and 2, and which tends to revolve the shaft 4 in the direction of the arrow $b$, increases progressively with time. Thus, after a given time, said electrostatic force exerts on said shaft 4 a torque sufficient to overcome the reverse torque exerted by the driving spring 36 on the shaft 4. From this moment, said shaft 4 is driven in the direction of the arrow $b$ and drives in its angular displacement the ratchet wheel 31 by means of the pawl 29. The electrodes 1 and 2 penetrate between the electrodes 5, 5a and 6, 6a and the barrel spring 36 winds up. The torque of said driving spring 36 remains, however, practically a constant value, as the electrodes 1 and 2 each presents a first part 42 having the shape of a sector of circle. The edges 43 of these parts have arcs of circles, and the torque due to the electrostatic force remains constant. It follows that the angular speed of the shaft 4 during the penetration of said parts 42 between the electrodes 5, 5a and 6, 6a remains constant, as well as the voltage between the armature and stator. This operation may be easily proved mathematically.

Said slow angular displacement at a constant speed continues until said parts 42 having the shape of a sector of a circle with a central angle of about 45° have penetrated entirely into the interior of the stator. The calculations show that during said angular displacement of ⅛ of a revolution, the condenser formed by the armature and stator stores a quantity of electric energy which is equal to the mechanical energy stored in the driving spring 36.

On the other hand, when the second part 44 of each of the electrodes 1 and 2, which has the shape of a sector of a spiral (the edges 45 being arcs of a spiral), penetrates between the fixed electrodes, the variation of capacity of said condenser in relation to the angular displacement of the shaft 4 increases much more quickly than formerly. Consequently, the electrostatic force acting on said armature is greater and its movement accelerates rapidly. The speed quickly reaches such a value that the increase of the load of the condenser due to the radiation of the radioactive substance becomes negligible with respect to the increase of the capacity so that the voltage between the armature and stator decreases in relation to the angular displacement of the shaft 4. It is evident that the pitch of the spiral used to form the edges 45 should be chosen in such a manner that the increase of capacity of the condenser may be such that after an angular displacement of about 22°, the position at which the electrodes 1 and 2 are entirely between the electrodes 5, 5a and 6, 6a, the voltage between these electrodes may be still sufficient to develop a driving torque able to overcome the reverse torque exerted on said shaft 4 by the driving spring 36.

Thus for instance, if the pitch of the spiral of the edges 44 is chosen in such a manner that the angular displacement of 22° corresponding to $\frac{1}{16}$ of a revolution, causes an increase of capacity from one to two, the voltage between the electrodes will be after said second displacement of $\frac{1}{16}$ of a revolution equal to half of the voltage which was reached after the first displacement of $\frac{1}{8}$ of a revolution of the shaft 4. Consequently, during said second angular displacement, the electric energy stored in the condenser will now be only one half of the energy stored after the first angular displacement of $\frac{1}{8}$ of a revolution. Thus, it follows that one half of the electric energy stored in the condenser during the first displacement of $\frac{1}{8}$ of a revolution has been transformed into work during said second displacement of $\frac{1}{16}$ of a revolution, whereby said work has been stored in form of mechanical energy in the driving spring 36.

At the end of said second angular displacement of the shaft 4, the electrode 1 abuts against the pin 26. The armature and stator being short circuited, the condenser will discharge itself and the electrostatic force becomes nil. The return spring 22 then causes the return of the armature to its initial position illustrated on the drawing and limited by means of the stop member 24.

The radioactive substance emitting its radiations permanently, the electrodes charge themselves progressively until the electrostatic force becomes sufficient to overcome the torque exerted on the shaft 4 by the driving spring 36 and the cycle described begins again.

Thus, there is obtained a periodical oscillatory movement of the shaft 4 which comprises four stages:

(1) The armature being in rest position (the position illustrated on the drawing), it will remain motionless during a time of about 1 minute necessary for the voltage between the armature and stator to reach a sufficient value to cause the driving of said armature against the action of the driving spring 36 and of the return spring 22.

(2) Slow displacement of the armature at a constant speed during about 7 to 8 minutes and the shaft 4 is driven in an angular displacement of about 45°.

(3) Accelerated displacement of the armature of a duration of about 5 seconds during which said shaft 4 performs about $\frac{1}{16}$ of a revolution. During said third stage a great part of the electric energy stored in the condenser during the second stage, will be transformed into mechanical energy and stored in the driving spring 36.

(4) Discharge of the electrodes of the condenser and the return stroke of the armature to its initial position. Said return stroke takes place in a few seconds under the action of the return spring 22.

During each oscillation of the shaft 4 the ratchet wheel 31 is driven in an angular displacement less than $\frac{3}{16}$ of a revolution as it is necessary to foresee, as illustrated in the drawing, a loss of a few degrees to allow the normal working of the driving and retaining pawls.

The driving spring 36 drives, by the intermediary of the toothed wheel 37, the first running wheel 38 of the clockwork 50 which is provided with regulating members, of known and standard types, tending to maintain the rotation of the running wheel 38 at a constant speed. Said regulating members comprise generally an escapement wheel cooperating with a swinging lever, the oscillatory movement of which is maintained by means of a balance wheel as shown.

In a variation, the spring 22 may be omitted. Indeed, when the extremity 27 of the electrode abuts against the pin 26 and the voltage between the electrodes becomes nil, the driving spring 36 drives the ratchet wheel 31 in the reverse direction according to the arrow *a* over a few degrees until one of the teeth of said ratchet wheel comes to bear against the retaining pawl 32. Consequently the ratchet wheel drives in this reverse angular displacement the shaft 4 by means of the driving pawl 29. The kinetic energy thus transferred from the spring 36 to the shaft 4 is sufficient to cause the return of the armature to its initial position.

I claim:

1. A driving device for a clockwork comprising an angularly displaceable armature and a stator forming a variable condenser, spring means acting on said angularly displaceable armature and tending to maintain said armature in a rest position, a layer of radioactive substance coating at least a part of one of the condenser members, whereby radiations emitted by said radioactive substance electrically charges said variable condenser and causes an angular displacement of said angularly displaceable armature against the action of said spring, and discharging means comprising at least one member on said condenser causing the automatic discharge of said condenser when said angularly displaceable armature reaches a given position with respect to said stator.

2. A driving device for a clockwork as claimed in claim 1 in which said angularly displaceable armature comprises a shaft and two electrodes fastened symmetrically on said shaft, and in which said stator comprises two groups of electrodes disposed symmetrically around said shaft whereby said two angularly displaceable electrodes interpenetrate said fixed electrodes.

3. A driving device for a clockwork as claimed in claim 2 and comprising a helical spring, a shaft driven by said spring, a ratchet wheel loosely mounted on said shaft, and connected to said spring, retaining and driving pawls cooperating with said ratchet wheel, said driving pawl being controlled by the shaft carrying said angularly displaceable armature.

4. A driving device for a clockwork as claimed in claim 2 and comprising a control member rigidly fastened to said shaft, a swinging lever controlled by said control member, and a ratchet wheel cooperating with said swinging lever, whereby said driving device is adapted to constitute the balance wheel of regulating means of the clockwork.

5. A driving device for a clockwork as claimed in claim 2 and comprising a recessed ratchet wheel, a helical spring housed within said recess, a shaft driven by said spring, said ratchet wheel being loosely mounted on said shaft, a retaining pawl cooperating with said ratchet wheel, a driving pawl carried by the shaft carrying said angularly displaceable armature, said driving pawl cooperating with said ratchet wheel, a toothed wheel rigidly fastened to said shaft driven by said spring, and clockwork regulating means driven by said toothed wheel.

References Cited in the file of this patent

UNITED STATES PATENTS

| | | |
|---|---|---|
| 1,910,434 | Hayes | May 23, 1933 |
| 2,340,697 | Russell et al. | Feb. 1, 1944 |
| 2,517,120 | Linder | Aug. 1, 1950 |
| 2,625,787 | Reiner | Jan. 30, 1953 |

FOREIGN PATENTS

| | | |
|---|---|---|
| 523,885 | France | Apr. 30, 1921 |
| 557,790 | Germany | Aug. 27, 1932 |